June 24, 1930.  W. K. HOWE  1,766,639
CONTACT SHOE
Filed Dec. 1, 1928  6 Sheets-Sheet 1

June 24, 1930.  W. K. HOWE  1,766,639
CONTACT SHOE
Filed Dec. 1, 1928

June 24, 1930.   W. K. HOWE   1,766,639
CONTACT SHOE
Filed Dec. 1, 1928   6 Sheets-Sheet 3

June 24, 1930.  W. K. HOWE  1,766,639
CONTACT SHOE
Filed Dec. 1, 1928    6 Sheets-Sheet 4

INVENTOR
W. K. Howe,
BY Neil D. Preston
his ATTORNEY

June 24, 1930.  W. K. HOWE  1,766,639
CONTACT SHOE
Filed Dec. 1, 1928  6 Sheets-Sheet 5
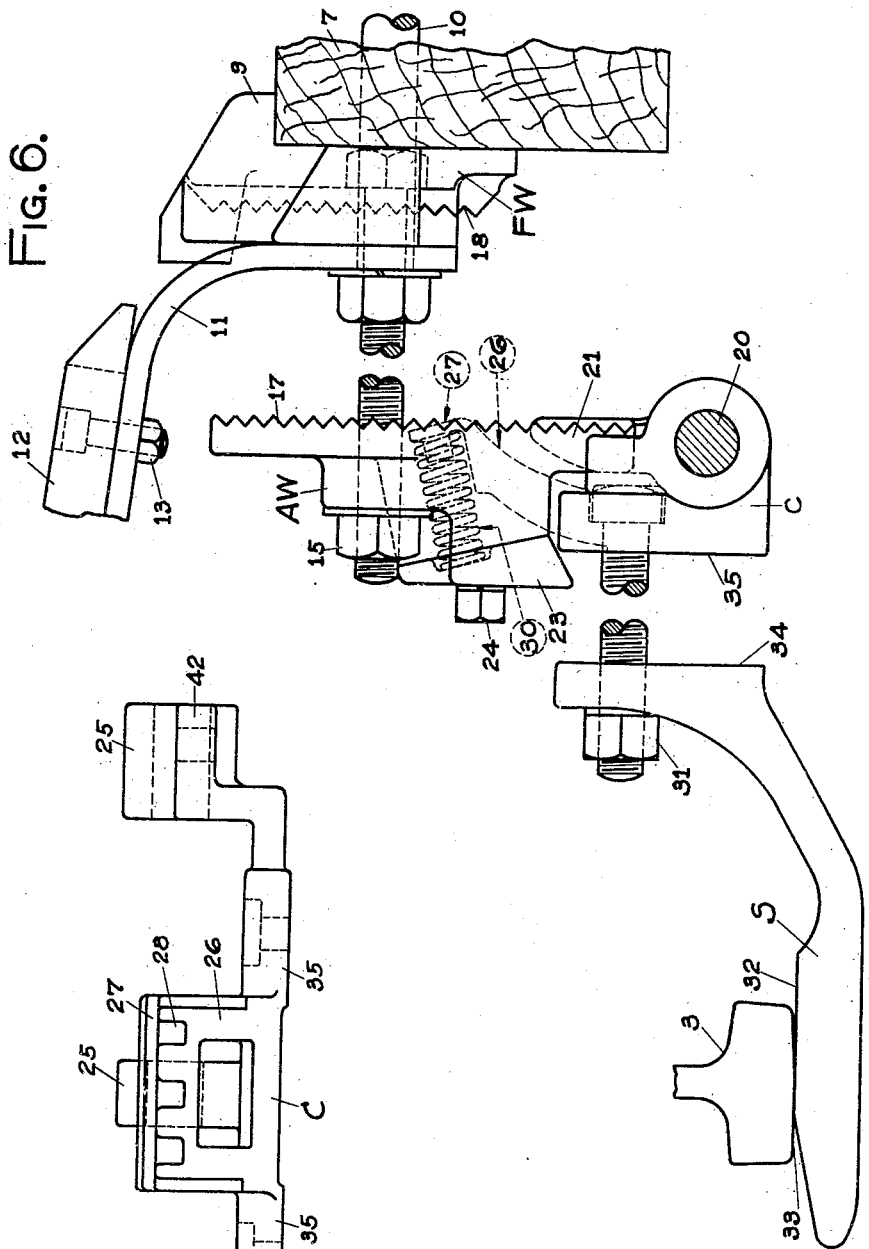
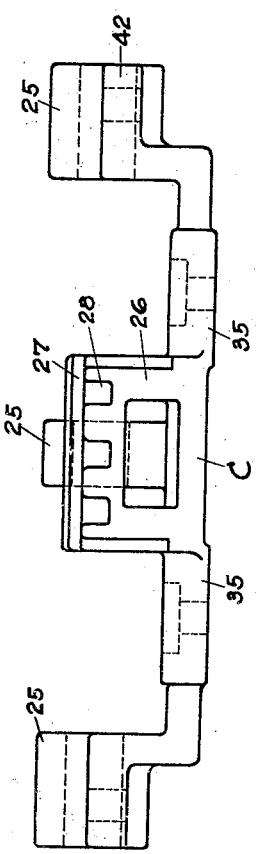
INVENTOR
W. K. Howe,
BY Neil W. Preston,
his ATTORNEY June 24, 1930.        W. K. HOWE              1,766,639
                     CONTACT SHOE
                  Filed Dec. 1, 1928        6 Sheets-Sheet 6

INVENTOR
W. K. Howe,
BY
Neil D. Preston,
his ATTORNEY

Patented June 24, 1930

1,766,639

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

CONTACT SHOE

Application filed December 1, 1928. Serial No. 323,112.

This invention relates, in general to an electric contact maker, and more specifically to a contact shoe to be carried by a car and cooperate with a usual third rail positioned in the trackway.

Among the objects of this invention is to provide a construction which is simple, rugged, and efficient and still cheap to manufacture.

It is also an object of this invention to provide an improved means for holding an axle in position for pivotally interconnecting two parts of the contact shoe. This is accomplished by providing a right angular plate for each end of the axle, one of the right angular portions bearing flat against an end of the axle, with the other right angular portion provided with means for receiving an attaching bolt for rigidly fastening it to one of the pivotally interconnected members.

Further objects, purposes and characteristic features of the invention will appear as the description progresses, reference being had to the accompanying drawing showing, solely by way of example, and in no manner whatsover in a limiting sense, one form which the invention can assume. In the drawings:—

Fig. 6 is an exploded view, in side elevation, of the contact shoe.

Fig. 7 is a top plan view of an intermediate carrier member forming part of the contact shoe.

Figure 1:
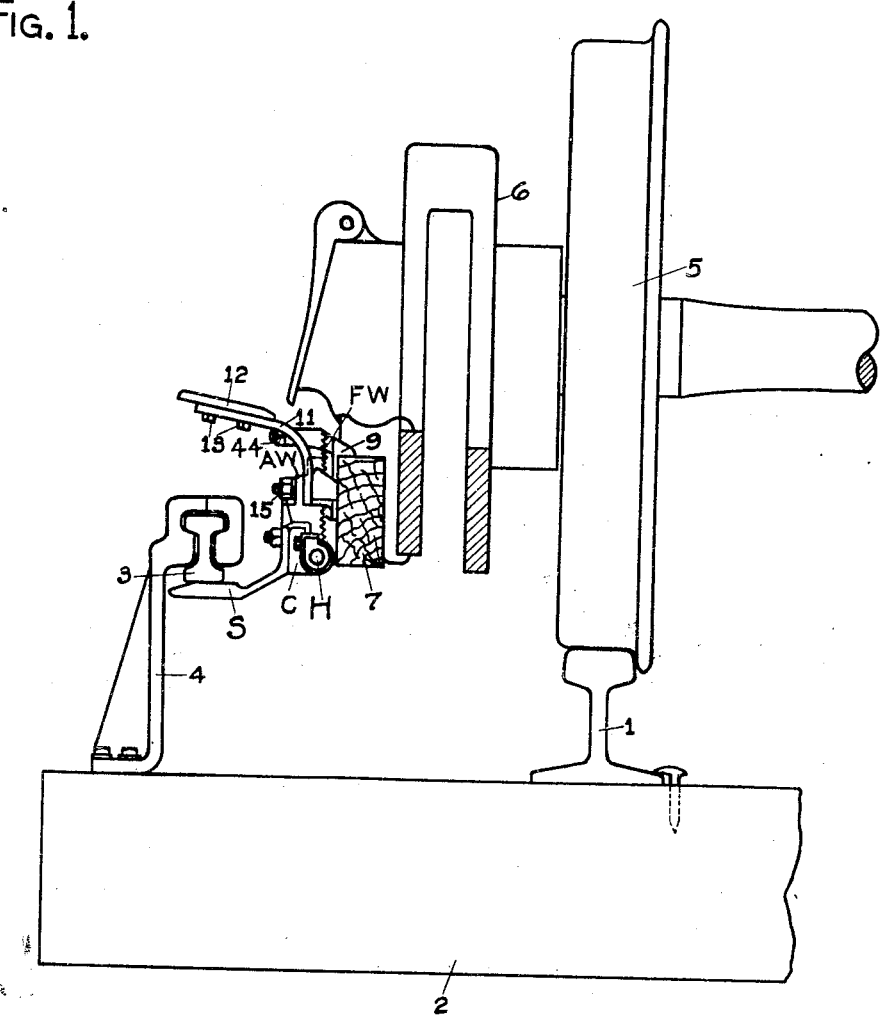
Fig. 1 is a side elevational view, with parts in section, showing the contact shoe in operative position.
Figure 2:
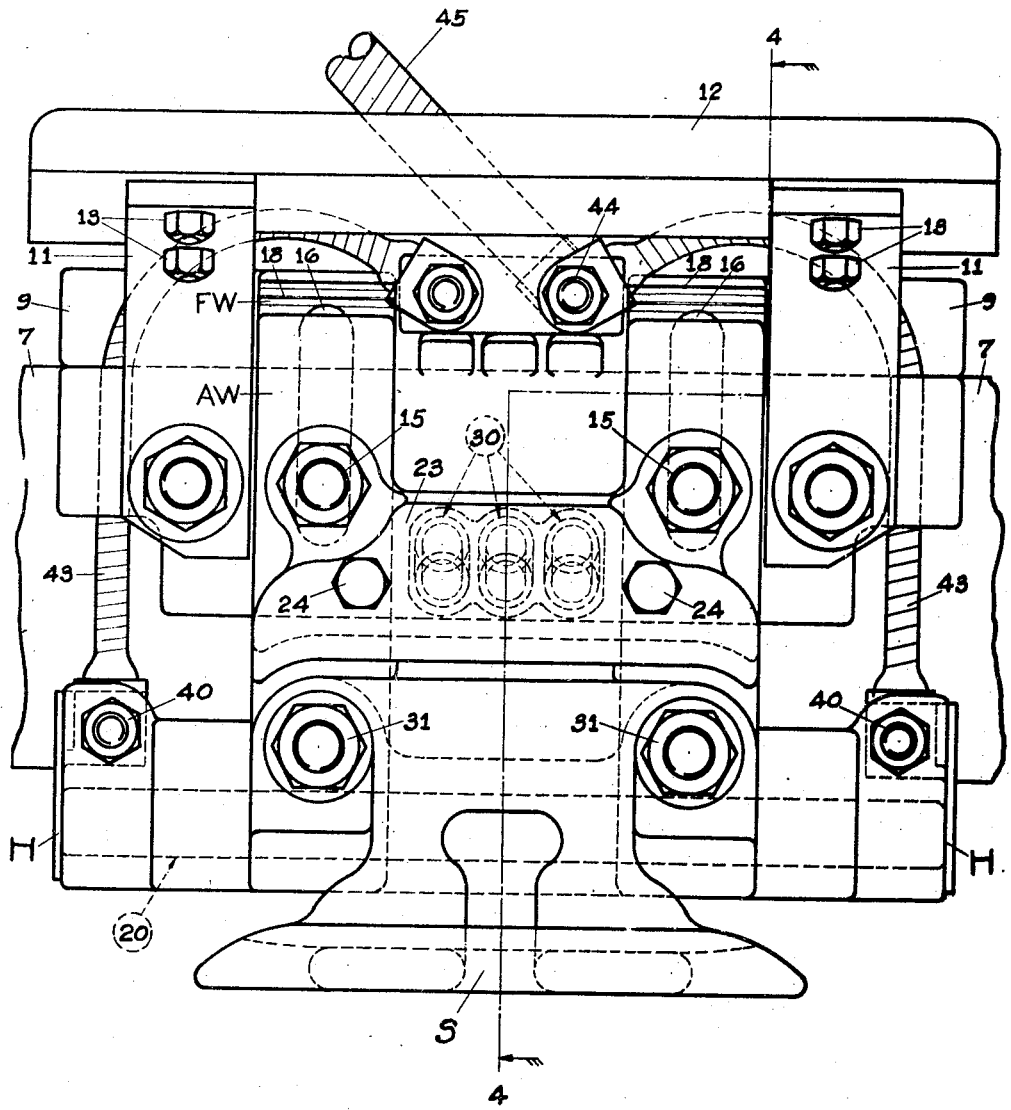
Fig. 2 is a front elevational view of a contact shoe in accordance with this invention.

Referring now to the drawings, and first to Fig. 1, there is shown a track rail, on a usual tie 2, on which tie is likewise supported a third rail 3, by means of a support bracket 4. Diagrammatically shown at 5, is a wheel and axle of a car, having a truck frame 6, to which is attached, in any desired or usual manner, a block 7 of wood or the like.

Connected to the block 7, is a fixed wash board FW, having retaining lugs 8 and 9, and connecting bolts 10, for holding it securely in place on the block 7. Attached to the fixed wash board FW, are brackets 11, carrying a guard member 12, connected thereto by bolts 13.

An adjustable wash board AW, is adjustably connected to the fixed wash board FW, by bolts 15 passing through slots 16 in the fixed wash board, horizontal corrugations or ribs 17 on the adjustable wash board fitting into like ribs 18 on the fixed wash board, to thereby hold the two wash boards in adjusted position upon tightening up of the bolts 15.

The adjustable wash board AW, has two spaced bored lugs 19 at its lower edge, for receiving an axle 20. Projecting upwardly from the lower part of the adjustable wash board, and centrally of the same so as to lie between the two lugs 19, is an integral stop member 21, for a purpose to be later described. In the front face of the adjustable wash board is an opening 22, closed by a cover 23, removably held in place by bolts 24.

A carrier member C, is pivotally connected to the adjustable wash board AW, by means of the axle 20. This carrier member C is shown separate from the associated parts, in Fig. 7, and comprises a preferably cast member having three rearwardly extending bored lugs 25, spaced as shown to allow the two lugs 19 of the adjustable wash board AW to fit each between a central lug 25 and an end lug 25, in which position the axle 20 passes through the lugs 19 and 1

25 so as to pivotally interconnect the carrier C and the adjustable wash board AW.

Figure 4:
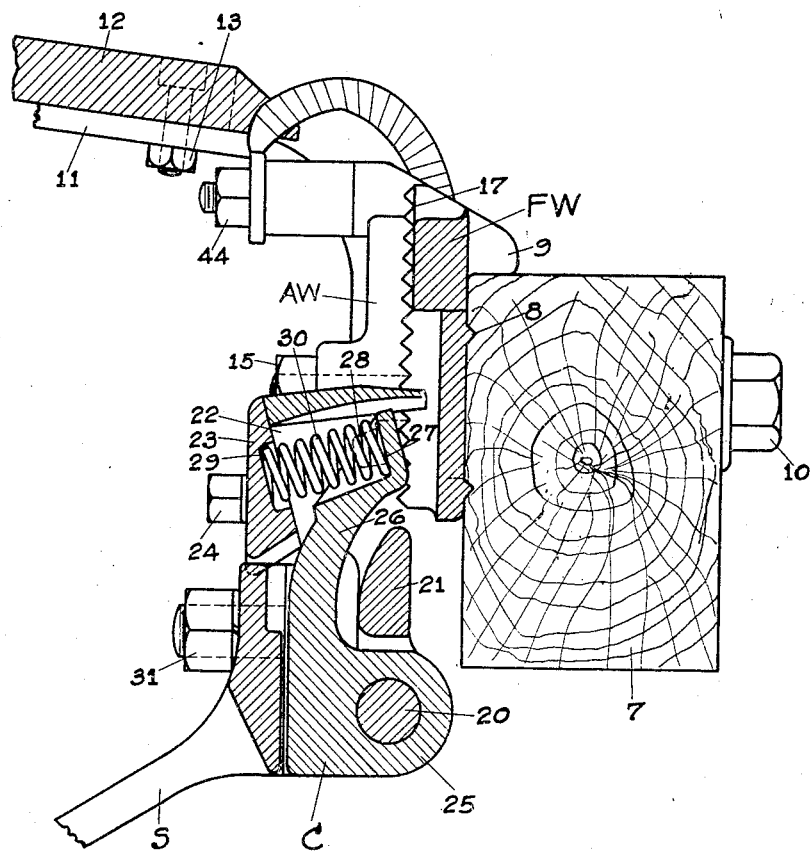
Fig. 4 is a sectional view, on line 4—4 of Fig. 2, and viewed in the direction of the arrows.

Extending upwardly from carrier C, and rearwardly, is an integral tongue 26, with a spring support member 27 at the upper end thereof, carrying, in the form illustrated, three spaced studs 28, positioned opposite to receiving sockets 29 in the removable plate 23, whereby to permit the placing in position of expansion springs 30, each with one end in a socket 29, and its other end to receive a stud 28. It is apparent from Fig. 4, for example, that the springs 30 tend to rotate the tongue in a clockwise direction about the axle 20, the extent of rotation being limited by the stop member 21, described above, which is positioned directly in the path of movement of tongue 26.

Rigidly connected to carrier member C, by means of bolts 31, is a contact member or shoe S, having a contact surface 32, for bearing upwardly against the lower face 33, of the third rail 3. The shoe S has a broad rear face 34, which fits against matching faces 35, on the carrier member C, so that the faces can then be bolted in tight contact by the bolts 31.

As can be readily seen from Fig. 6, for example, the springs 30 continuously bias shoe S in a clockwise direction so as to tightly press together the two contact surfaces 32 and 33, while, when the shoe is not in use, stop 21 operates to prevent too great a rotation of shoe S under the urge of springs 30.

Figure 5:
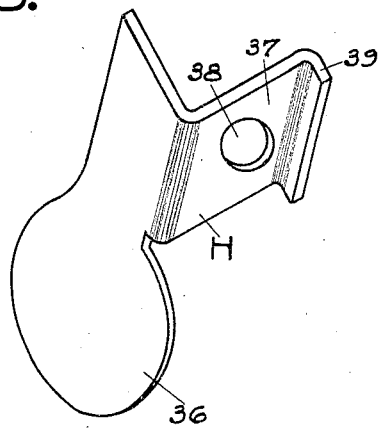
Fig. 5 is an isometric view of an axle retaining means, in accordance with this invention.
Figure 8:
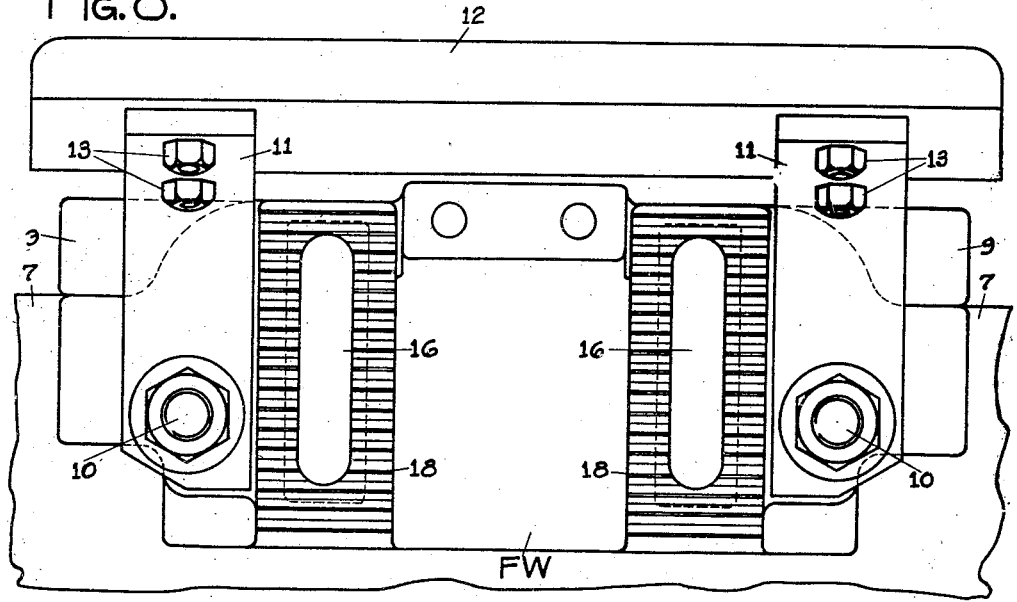
Fig. 8 is a front elevational view of the shoe, with portions removed.
Figure 9:
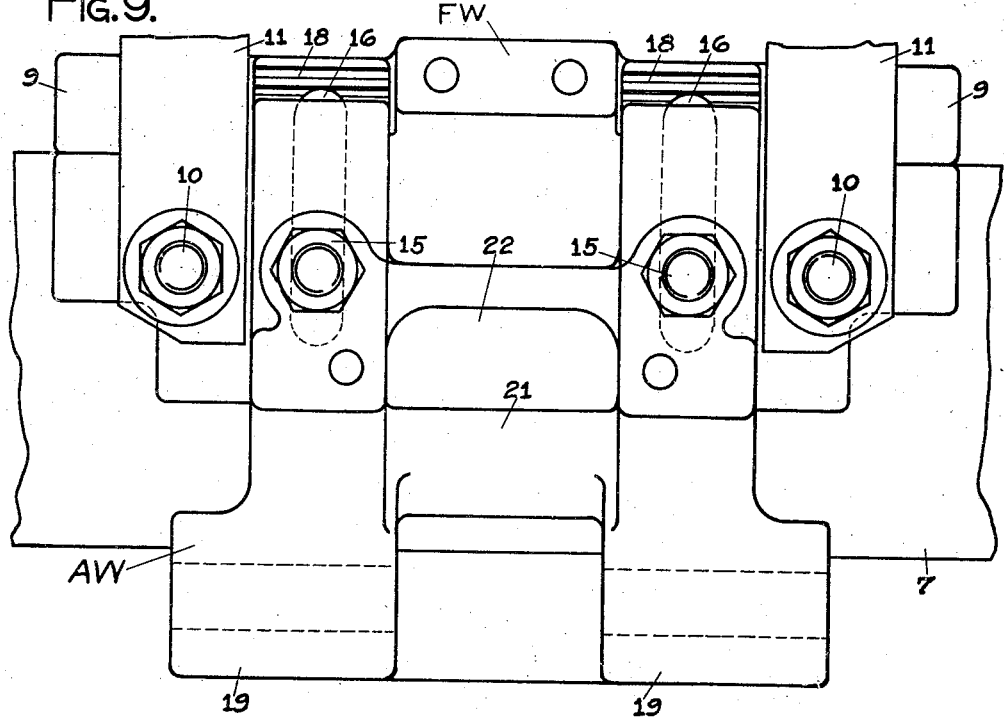
Fig. 9 is a front elevational view of the shoe similar to Fig. 8, but with certain additional portions shown.

As shown in detail in Fig. 5, holding plates H are employed for holding axle 20 in proper operative position, these holding plates replacing the usual cotter pins, and being formed by stamping them out of heavy sheet material, or in any other desired or usual manner. Each plate H comprises a flat holding face 36, at right angles thereto a clamping face 37 having a hole 38 therein, for the reception of a holding bolt, and a lock shoulder 39 at right angles to the clamping face 37, for locking a nut or a bolt head against rotation.

Figure 3:
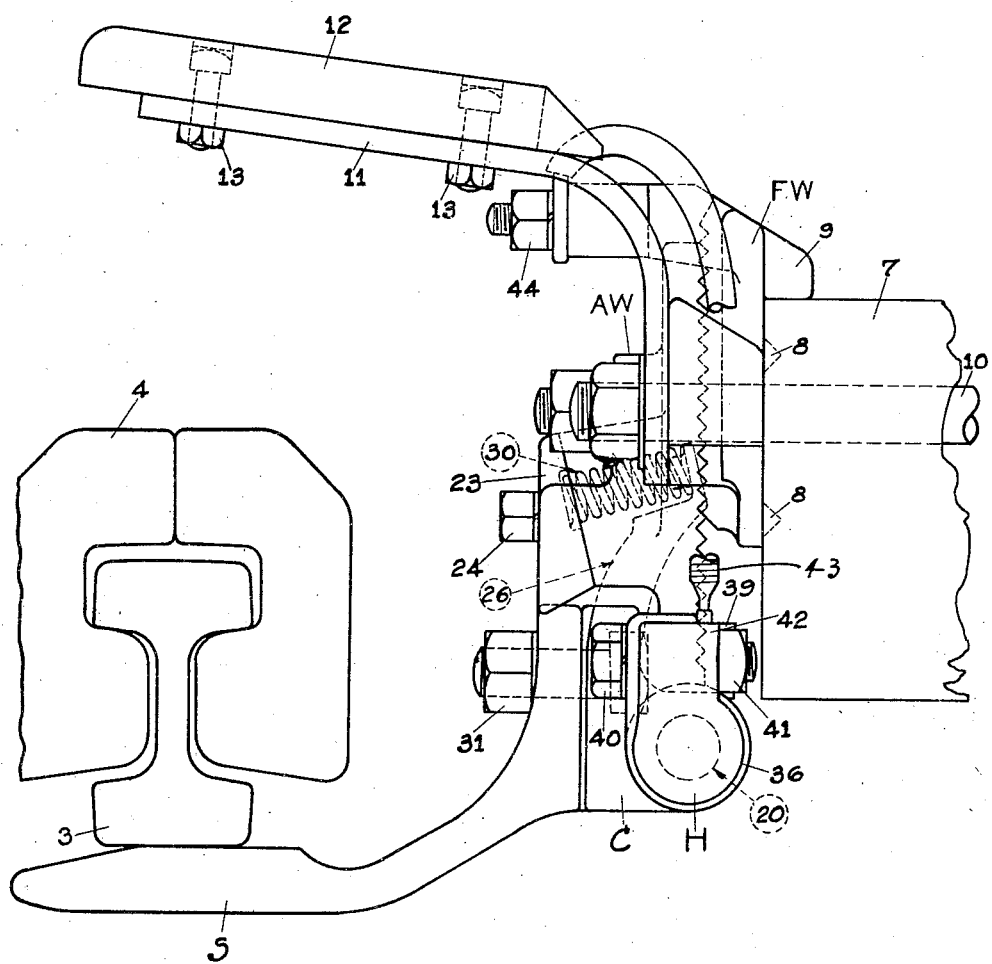
Fig. 3 is a side elevational view of the contact shoe, to an enlarged scale.

As best shown in Fig. 3, the holding plate H is rigidly attached, by bolts 40 and nuts 41, to upstanding integral lugs 42, on the two outer bearings 25, of carrier C, the locking shoulder 39 operating to hold the nut 41 in fixed position, while the flat clamping face 36 is positioned to bear flat against the outer end of axle 20, and its receiving bearing 25, on carrier member C, to thereby effectually prevent endwise movement of axle 20 relatively to the two members pivotally interconnected by the axle.

In a usual manner, lead-in conductors 43 are clamped in place against the lugs 42, and are connected at the other ends to posts 44, from which leads out a conductor 45.

Instead of having matching flat faces in contact where the shoe S and the carrier C are clamped together, it is contemplated, if desirable, to employ corrugated faces, whereby to perhaps somewhat more securely hold these two members in fixed interconnected relationship.

The above rather specific description of one form of the present invention is given solely by way of illustration, and is not intended, in any manner whatsoever, in a limiting sense. Obviously, the invention can assume many different physical forms, and is susceptible of numerous modifications, and all such forms and modifications are intended to be included in this application, as come within the scope of the appended claims.

Having described my invention, I now claim:—

1. In a contact shoe for third rails, in combination, a fixed wash board, a movable wash board adjustably carried by said fixed wash board, a separate carrier pivoted to said movable wash board, a contact shoe rigidly removably clamped to said carrier, an integral tongue on said carrier extending upwardly and rearwardly, resilient means positioned between said tongue and said movable wash board to bias said contact shoe in one direction, and an integral stop on said movable wash board positioned in the path of movement of said tongue to thus limit the biased movement of said contact shoe.

2. In a contact shoe for third rails, in combination, a fixed wash board, a movable wash board adjustably carried by said fixed wash board, a carrier pivoted to said movable wash board, a contact shoe fixed to said carrier, an integral tongue on said carrier, resilient means positioned between said tongue and said movable wash board to thus bias said contact shoe in one direction, an integral stop on said movable wash board positioned in the path of movement of said tongue to thus limit the biased movement of said contact shoe, an opening in said movable wash board, and a cover removably positioned over said opening and having receiving means in its inner face for receiving said resilient means.

3. In a contact shoe for third rails, in combination, a fixed wash board, a movable wash board adjustably carried by said fixed wash board, a carrier pivoted to said movable wash board, a contact shoe fixed to said carrier, an integral tongue on said carrier extending upwardly and rearwardly, receiving studs carried by the upper end of said tongue, resilient means on said studs, and positioned between said tongue and said moveable wash board to thus bias said contact shoe in one direction, an integral stop on said movable wash board positioned in the path of movement of said tongue to thus limit the biased movement of said contact shoe, an opening in said movable wash board, and a cover removably positioned over said opening and having receiving means in its inner face for receiving said resilient means.

4. In a contact shoe, in combination, a contact member, a support member for said contact member, an axle pivotally interconnecting said two members, and means for holding said axle in proper position, including, for each end of said axle, a plate having a flat face bearing against the end of said axle, and means mounting said plates on one of said members.

5. In a contact shoe, in combination, a contact member, a support member for said contact member, an axle pivotally interconnecting said two members, and means for holding said axle in proper position, including, a holding plate at each end of said axle, each plate being clamped in fixed position to said contact member, and having a flat holding face bearing flat against an end of said axle to thus prevent endwise movement of said axle.

6. In a contact shoe, in combination, a contact member, a support member for said contact member, an axle pivotally interconnecting said two members, and means for holding said axle in proper position, including, a holding plate at each end of said axle, each plate having a flat holding face, at right angles, thereto a flat clamping face, and at right angles thereto a nut locking shoulder and bolt means clamping it in fixed position, to said contact member, by its clamping face, and having a flat holding face bearing flat against an end of said axle to thus prevent endwise movement of said axle.

7. In a contact shoe, in combination, a fixed wash board, a movable wash board adjustably supported on said fixed wash board, spaced perforated hubs at the lower edge of said movable wash board forming bearings, a separate carrier having a central projecting tongue and spaced perforated hubs positioned at either side of said tongue, an axle passing through said hubs to pivotally connect said carrier to said movable wash board with said tongue extending upwardly and rearwardly of a portion of said movable wash board, a contact shoe rigidly removably clamped to said carrier, and springs positioned between said tongue and said portion of said movable wash board to bias said contact shoe in one direction.

8. In a contact shoe, in combination, a fixed wash board, a movable wash board adjustably supported on said fixed wash board, spaced perforated hubs at the lower edge of said movable wash board forming bearings, a carrier having a central projecting tongue and spaced perforated hubs positioned at either side of said tongue, an axle passing through said hubs to pivotally connect said carrier to said movable wash board with said tongue extending upwardly and rearwardly of portions of said movable wash board, a contact shoe fixed to said carrier, springs positioned between said tongue and said movable wash board to bias said contact shoe in one direction, and a central fixed stop member on said movable wash board in line with said tongue to limit the biased movement of said contact shoe.

9. In a contact shoe, in combination, a fixed wash board, a movable wash board adjustably supported on said fixed wash board, spaced perforated hubs at the lower edge of said movable wash board forming bearings, a carrier having a central projecting tongue and spaced perforated hubs positioned at either side of said tongue, an axle passing through said hubs to pivotally connect said carrier to said movable wash board, a contact shoe fixed to said carrier, means positioned between said tongue and said movable wash board to bias said contact shoe in one direction, a central fixed stop member on said movable wash board in line with said tongue to limit the biased movement of said contact shoe, and stop plates, bearing flat against the ends of said axle and clamped in position to said hubs, to hold said axle in proper position.

In testimony whereof I affix my signature.

WINTHROP K. HOWE.